United States Patent [19]
Binon et al.

[11] 3,810,991
[45] May 14, 1974

[54] A METHOD OF INDUCING FIBRINOLYSIS

[75] Inventors: Fernand Binon, Strombeek-Bever; Henri Inion, Wemmel, both of Belgium

[73] Assignee: Labaz, Paris, France

[22] Filed: Apr. 17, 1972

[21] Appl. No.: 244,495

[30] Foreign Application Priority Data
Apr. 29, 1971   Great Britain .................. 12277/71

[52] U.S. Cl. .............................................. 424/263
[51] Int. Cl. ............................................ A61k 27/00
[58] Field of Search .................................. 424/263

[56] References Cited
FOREIGN PATENTS OR APPLICATIONS
1,025,697   4/1966   Great Britain
1,245,283   9/1971   Great Britain OTHER PUBLICATIONS
Binon et al., Chemical Abstracts 68: 59,388g (1968).
Binon et al., Chemical Abstracts 70: 68,077f (1969).

Primary Examiner—Albert T. Meyers
Assistant Examiner—Norman A. Drezin
Attorney, Agent, or Firm—Mason, Kolehmainen, Rathburn & Wyss

[57] ABSTRACT

Method of treating mammals to induce fibrinolysis or counteract fibrinolytic syndromes by administering a compound of the formula

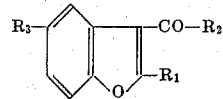

wherein $R_1$ represents a straight or branched chain alkyl group containing from 1 to 8 carbon atoms, cyclohexyl, or phenyl, 4-methylphenyl or 4-chlorophenyl; $R_2$ represents 4-pyridyl or N-oxide derivative thereof; and $R_3$ represents hydrogen, hydroxyl, methyl, methoxyl, chlorine or bromine or a pharmaceutically acceptable acid solution salt of said benzofuran derivative, and a pharmaceutical carrier therefor.

2 Claims, No Drawings

A METHOD OF INDUCING FIBRINOLYSIS

This invention relates to therapeutic use of pharmacologically active benzofuran derivatives and is concerned with compositions containing benzofuran derivatives having fibrinolytic or antifibrinolytic properties.

We have discovered that there is a class of benzofuran derivatives the individual members of which possess fibrinolytic or antifibrinolytic properties.

Thus, in accordance with one aspect of the present invention there is provided a pharmaceutical or veterinary composition comprising, as an essential active ingredient, a benzofuran derivative represented by the general formula

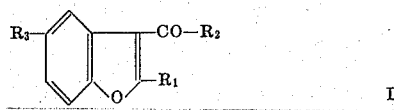

wherein $R_1$ represents a straight or branched chain alkyl group containing from 1 to 8 carbon atoms, cyclohexyl, or phenyl, 4-methylphenyl or 4-chlorophenyl; $R_2$ represents 4-pyridyl or N-oxide derivative thereof; and $R_3$ represents hydrogen, hydroxyl, methyl, methoxyl, chlorine or bromine or a pharmaceutically acceptable acid addition salt of said benzofuran derivative, and a pharmaceutical carrier therefor.

In accordance with another aspect of the present invention there is provided a novel class of benzofuran derivatives consisting of the benzofuran derivatives represented by formula I and the pharmaceutically acceptable acid addition salts thereof, the values of $R_1$, $R_2$ and $R_3$ being chosen so that when $R_2$ is 4-pyridyl and $R_3$ is hydrogen, $R_1$ is not an alkyl group containing from 1 to 3 carbon atoms, n-butyl or phenyl, and when $R_2$ is 4-pyridyl and $R_3$ is hydroxyl, methyl, methoxyl, chlorine or bromine, $R_1$ is not an alkyl group containing from 1 to 3 carbon atoms or n-butyl.

The benzofuran derivatives represented by formula I can be prepared, in accordance with the invention, by the use of a known procedure, such as by reacting, in the presence of aluminum chloride and preferably in an inert medium, for example, carbon disulfide or dichloroethane, the hydrochloride of isonicotinoyl chloride or the chloride of isonicotinoyl-N-oxide, with an appropriately substituted benzofuran represented by the general formula

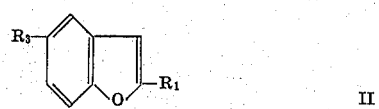

wherein $R_1$ and $R_3$ have the same meanings as in formula I. This procedure is described in Chimie Therapeutique 2, 113(1967).

The starting-materials represented by formula II are either known products or can be prepared by known procedures as described in J. Chem. Soc. 3688 (1955).

The acid addition salts of the compounds of formula I can be prepared by treatment of the free base with an appropriate acid, usually in the presence of an organic medium such as, for example, benzene or tetrahydrofuran.

As previously mentioned, the benzofuran derivatives of the invention have been found to possess fibrinolytic or antifibrinolytic properties which are particularly effective. Their action is exerted not only at the level of the vascular wall but also of the blood plasma, a fact which differentiates them from numerous known substances possessing fibrinolytic or antifibrinolytic properties such as, for example, nicotinic acid, O-(β-hydroxyethyl)-rutoside, ethyl-tri-O-benzyl-3,5,6-D-glucofuranoside and ε-aminocaproic acid.

These properties render the fibrinolytic compounds of the invention valuable in the treatment of venous disorders and of thrombo-embolic states (which may be accompanied by lipidaemia) and the antifibrinolytic compounds valuable in the treatment of acute, subacute, latent and local fibrinolytic syndromes.

Hence, in accordance with a further aspect of the invention, there is provided a method of inducing fibrinolysis or combating fibrinolytic states in an animal host comprising administering to the subject concerned an effective dose of a benzofuran derivative represented by formula I as defined above or of a pharmaceutically acceptable acid addition salt thereof. Such an effective dose can take the form of a tablet containing 100 mg. of a compound of formula I administered 4 to 10 times a day to a patient weighing 60 kilos or of a tablet containing 200 mg. of a compound of formula I administered 2 to 5 times a day to a patient weighing 60 kilos.

The following is a list of instances where such fibrinolytic syndromes may occur:

Acute: General surgery, obstetrics

Subacute: Blood diseases, cancer, shock, acute infections, cyanogenetic heart disorders, aneurism, cirrhosis Latent: Polyglobulism, thrombocythaemia, hepatic insufficiency Local: Thorac surgery, urology, orthopedic surgery With particular regard to the treatment of thromboembolic states, the technique at present employed is based upon anticoagulants. This type of medication, although satisfactory to a certain degree, is not without danger. When writing of the treatment of cardiovascular diseases, C. Raby, in his book "Biologie des Hemorragies et des Thromboses" (Masson & Cie, 1966) emphasizes this point. On the subject of anticoagulants, he says: "When they are given in insufficient doses, they are without effect and protection is purely illusory. When they are given to excess they become dangerous and cause haemorrhagic complications which are sometimes fatal. When they are ill-chosen, they may be both useless and harmful."

Further on, this same author recommends that in order to combat incipient or existing states of thrombosis, the most logical therapy would be to employ substances which are either themselves thrombolytic or capable of intensifying the body's own lytic processes.

From this, it may be reasonably concluded that the ideal agent for combating thrombo-embolic states, whether latent, incipient or already constituted, would be a substance capable of exerting a two-fold action, namely:

1. Complete dissolution in situ of thrombi
2. Prevention of the formation of new thrombi without influencing the coagulability of the blood.

Various tests carried out with the compounds of the invention indicate that those which belong to the fibrinolytic category possess these properties.

It has, in fact, been observed that the fibrinolytic compounds of the invention exert a direct dissolving effect upon thrombi at the level of the vasuclar wall and, to a lesser degree, through the medium of the blood plasma itself. Furthermore, it has been found that these compounds do not exert any anticoagulant action or potentiate anticoagulant effects, while at the same time they create in the blood-stream conditions which tend to prevent the formation of thrombi. It has also been found that the action of the compounds of the invention, both fibrinolytic and antifibrinolytic is rapid, intense and prolonged. Finally, even after administration over a long period of time, no signs of habituation have been observed.

Pharmacological trials have been carried out with a view to determining the fibrinolytic or antifibrinolytic activities of the compounds of formula I. The procedure followed was that of Todd (J. Pathol. Bacter. 78, 281, 1959) adapted to the vena cava inferior of the rat as described in Arzn. Forschung, 20, 358, 1970.

In these trials, one single dose of 100 mg/kg of each compound studied was employed, administered intraperitoneally.

Male rats weighing 150 to 200 g. and having fasted for 24 hours were divided into two groups. The animals of one group were given the above-indicated dose of the compound to be tested. The animals of the other group, which constituted the control group, were treated in exactly the same way as the test animals except that the active compound present in the dose administered to the test animals was replaced by an equivalent quantity of the diluent or excipient used in the dose.

After 40 minutes, the treated animals were sacrificed simultaneously with the control animals, the veins immediately removed, rinsed with physiological salt solution, frozen and cut into pieces having a thickness of 20 microns. On each piece, a film of fibrin was formed by the application of a bovine fibrinogenous solution, rich in plasminogen, and of a thrombin solution.

The preparations were all incubated at 37°C. for 30 minutes, which preliminary trials had shown to be the most suitable incubation period. All the preparations were then fixed with a 10 percent neutral formalin solution, stained with haematoxylin of Harris and covered with gelatin. Microscopic examination revealed three degrees of reaction namely:

Value = 0: The film of fibrin was intact.
Value = 1: The lysis zones in the endothelium were disseminated.
Value = 2: The lysis zones were larger and more or less joined.
Value = 3: The fibrin in contact with the endothelium was almost completely decomposed.

The fibrinolytic index represents the average of the values of the reactions obtained for each incubation.

The following results were registered. These results express in percent the variations in the fibrinolytic index of the treated groups as compared with that of the control animals. A positive figure indicates a degree of fibrinolytic activity while a negative figure indicates a degree of anti-fibrinolytic activity.

TABLE I

| $R_1$ | $R_2$ | $R_3$ | Activity (%) |
| --- | --- | --- | --- |
| ethyl | 4-pyridyl | hydrogen | +110 |
| n-butyl | 4-pyridyl | hydrogen | +61 |
| ethyl | 4-pyridyl | chlorine | −12 |
| ethyl | 4-pyridyl-N-oxide | hydrogen | +72 |
| n-propyl | 4-pyridyl | hydrogen | +83 |
| ethyl | 4-pyridyl | methyl | +67 |
| ethyl | 4-pyridyl | bromine | +13 |
| isopropyl | 4-pyridyl | hydrogen | +176 |
| 2-methyl-1-propyl | 4-pyridyl | hydrogen | +51 |
| 2,2-dimethyl-1-propyl | 4-pyridyl | hydrogen | +14 |
| 3-methyl-1-butyl | 4-pyridyl | hydrogen | +48 |
| phenyl | 4-pyridyl | hydrogen | −35 |
| 4-chlorophenyl | 4-pyridyl | hydrogen | −42 |
| 2-butyl | 4-pyridyl | hydrogen | +21 |
| 4-methylphenyl | 4-pyridyl | hydrogen | +21 |
| 2-pentyl | 4-pyridyl | hydrogen | +8 |
| 3-pentyl | 4-pyridyl | hydrogen | +66 |
| 4-heptyl | 4-pyridyl | hydrogen | −8 |
| n-hexyl | 4-pyridyl | hydrogen | +115 |
| n-octyl | 4-pyridyl | hydrogen | +37 |
| cyclohexyl | 4-pyridyl | hydrogen | +112 |
| methyl | 4-pyridyl | methoxyl | −40 |

The above table shows that the most active compound as regards fibrinolysis is 4-pyridyl 3-(2-isopropyl)benzofurylketone hereinafter referred to as Compound A, while 4-pyridyl 3-(2-p-chlorophenyl)-benzofurylketone is the most active as regards antifibrinolytic properties.

Further pharmacological tests were undertaken in accordance with the Todd technique in order to determine the degree of activity exerted at different times after administration.

A single intraperitoneal dose of 100 mg/kg of Compound A was administered to a group of rats which were sacrificed at different times after administration. This test showed that the activity of Compound A was significant after 15 minutes, at its maximum after 40 minutes and had disappeared after 90 minutes.

The same single dose was also administered to a group of rats by the intragastric route and a similar procedure adopted. This test showed that, by this route, the activity of Compound A was significant 2 hours after administration, was at its maximum after 5 hours and had disappeared after 15 hours.

The same test carried out on rats by intramascular route at a dose of 50 mg/kg showed that the activity of Compound A was significant after 1½ hours, at its maximum after 2½ hours and disappeared after 4 hours.

For comparative purposes, a similar test was carried out on rats by intraperitoneal route with the following substances, recognized as possessing fibrinolytic properties in humans, and in the doses indicated:

| SUBSTANCE | SINGLE DOSE |
| --- | --- |
| O-(β-hydroxyethyl)rutoside | 600 mg/kg |
| Ethyl-tri-O-benzyl-3,5,6-D-glucofuranoside | 500 mg/kg |
| Nicotinic acid | 50 mg/kg (toxic at higher doses) |

The animals were sacrificed at different times up to 60 minutes after administration and it was found that none of the substances cited had produced any increase in the fibrinolytic index at the end of the 60-minute period, whereas the derivatives of the invention and in particular Compound A had shown an appreciable increase in their fibrinolytic index after 40 minutes.

Tests were also performed in order to study the dose-effect ratio of the compounds of the invention with regard to activity at the level of the vascular wall. Here, the compounds were administered to rats by the intraperitoneal and intragastric routes.

The animals were divided into various groups which received different doses of the compounds to be studied. Those animals which had received the compounds by intraperitoneal route were all sacrificed 40 minutes after administration and it was found, in the case of Compound A, that activity was significant at 0.8 mg/kg and progressively increased to attain its maximum at about 10 mg/kg. The animals which had received the compounds by intragastric route were all sacrificed 5 hours after administration. Here, it was found that, in the case of Compound A, activity was significant at 1 mg/kg and progressively increased to attain its maximum at 12.5 mg/kg.

In another series of tests, 50 mg/kg of Compound A were administered to rats every day for 3 months. It was found that the fibrinolytic index which quickly rose to 170 percent remained at this level throughout the 3-month period. This shows that the action is continuous and does not tend to disappear, unlike other substances with fibrinolytic properties, such as nicotinic acid, of which the action disappears after 2 to 3 days.

Various tests which have been carried out, such as Howell's time test, the heparine-tolerance test and Quick's time test, have shown that the compounds of the invention do not exert any influence on blood coagulation.

No potentialisation of the effects of anticoagulants has been observed.

Compounds of formula I also exert a fibrinolytic effect on plasma which was evidenced, in vitro, on human plasma following Von Kaulla's technique (J. Med. Chem. 8, 164, 1965).

For this purpose, clots were prepared in accordance with standard procedures from recalcified human plasma. These clots were introduced into increasingly diluted buffered solutions of Compound A maintained at 37°C. The clots in the various solutions were examined after 24, 48 and 72 hours and the degree of decomposition noted. At a concentration of 20 m. mol/ml, lysis of the clots occurred after 48 hours. In the same test, nicotinic acid, ethyl-tri-O-benzyl-3,5,6-D-glucofuranoside and o-($\beta$-hydroxy-ethyl)-rutoside were found to be inactive.

The euglobulin lysis time test and Astrup plate test which were carried out in vivo on the unanaesthetized dog showed that the compounds of the invention are particularly active on plasma of animal origin. It was found, for example, that with Compound A at a daily dose of 100 mg/kg administered by intragastric route to five unanaesthetized dogs, fibrinolytic activity rose to 189.2 percent in the euglobulin lysis time test and to 113.2 percent in the Astrup plate test, as compared with the same tests carried out on the blood of the same animals before they received the compound.

These findings were later confirmed with other dogs by thrombelastography on the euglobulinic fraction of the plasma.

Further pharmacological trials were carried out in accordance with the Fearnley technique (Clin. Sci. 16, 645 (1957) in order to determine the degree of plasmatic fibrinolytic activity exerted at different times after administration.

This test was performed on rats which had received a single intraperitoneal dose of 50 mg/kg of Compound A in the form of a 1 percent suspension in gum arabic. This test showed that the activity of Compound A was significant after 20 minutes, at its maximum after 40 minutes and disappeared after 80 minutes.

Tests were also performed on rats in order to study the dose/effect ratio of the compounds of the invention with respect to plasma. The animals were divided into groups which received different intraperitoneal doses of the compounds to be tested. The animals were sacrificed 40 minutes after administration and it was found, in the case of Compound A, that fibrinolytic activity on plasma was significant at about 6 mg/kg and that it increased progressively to reach its maximum at 25 mg/kg.

With particular regard to the dissolution of thrombi in situ, tests were carried out on dogs in which a thrombus had been artificially created. The technique used was that described by Roschlau et al. in Canad. J. Biochem. Physiol., 40, 1919 (1962). According to this technique, the femoral artery is uncovered under anaesthesia and the blood-stream reduced by about two thirds by a ligature. A clamp is then placed on the artery about 1 inch above the ligature. A needle is inserted into the artery between the clamp and the ligature and a blunt wire passed through the needle. The whole of the interior of the arterial wall is eroded by means of the wire which is then withdrawn with the needle. The clamp is removed and the wound sutured. After 48 hours, the animal is again anaesthetized and the presence of the thrombus verified after which the ligature is removed. Only those animals which have an occlusive thrombus are retained for the remainder of the experiment. The compound to be tested is given by oral route as soon as the thrombus has formed. After a given number of days, the animal is sacrificed and the segment of artery in which the thrombus has been created is immediately removed and submitted to histological colouration by means of fuchsine paraldehyde which enables an exact appreciation of the state of the thrombus to be made.

In the experimental thrombus trials carried out in support of the invention, it was found that the thrombus was completely dissolved by a daily oral dose of 100 mg/kg of Compound A given over a period of 10 days while the same result was obtained with 25 mg/kg of Compound A given orally over a period of 20 days.

The effects of the compounds of formula I on the lipid-level in the circulation of ovariectomised rats were also studied by intragastric route. Tests were performed with Compound A at a dose of 50 mg/kg. A significant decrease in the concentration of the glycerides in the blood was noted.

Toxicity trials were carried out on rats and mice by intraperitoneal and intragastric routes. It was found that the $LD_{50}$ of Compound A for rats was 950 mg/kg by the intraperitoneal route and 1,100 mg/kg when administered intragastrically. The corresponding figures for Compound A for mice were found to be 550 mg/kg and 1,500 mg/kg respectively. Since the normal active pharmacological dose is in the region of 100 mg/kg, it is seen that the toxic doses are far in excess of this amount which means that there is a very wide margin of safety.

The pharmaceutical or veterinary compositions of the invention will normally comprise, as an essential active ingredient, at least one compound of formula I or a pharmaceutically acceptable acid addition salt thereof, in association with a pharmaceutical carrier therefor. The carrier may be a solid or liquid diluent or excipient of the kind normally employed in the production of medicaments ready for use, for example, lactose, talc, magnesium stearate, colloidal silica, alginic acid, gelatine, polyvinylpyrrolidone, polyoxyethyleneglycol stearate or propyleneglycol.

The composition may be made up in a form suitable for the desired mode of administration, which may be by the oral or parenteral route. Advantageously for clinical use, the composition is made up in a dosage unit form adapted for the desired mode of administration. The dosage unit may be, for example, a tablet, pill, packaged powder, capsule, or measured amount of syrup for oral administration, or a sterile solution packaged in a sealed container such as an ampoule for parenteral administration. The amount of active ingredient in each dosage unit will be such that one or more units are required for each therapeutic administration.

The following examples illustrate the invention.

EXAMPLE 1

Preparation of 4-pyridyl-3-(2-isopropyl)-benzofuryl-ketone and its hydrochloride.

Into a 1-litre three-necked flask fitted with an ascending condenser, a dip thermometer, a dropping-funnel and a mechanical stirrer, were introduced 200 ml. of dry dichlorethane, 45 g. (0.253 mol) of the hydrochloride of isonicotinoyl chloride and 63.5 g. of anhydrous aluminium chloride. While stirring vigorously, the temperature was lowered to 10°C. by means of an ice-bath. 27.3 g. (0.17 mol) of 2-isopropyl-benzofuran were then introduced drop by drop through the dropping funnel while the temperature of the reaction medium was maintained at 10°C. The solution was then stirred for 22 hours at room temperature. The complex which formed was then broken down by adding approximately 200 ml. of a 20 percent aqueous hydrochloric acid solution. During this operation the temperature of the reaction medium was maintained below 30°C. The reaction mixture was then poured into a beaker containing about 500 g. of ice. While stirring, the reaction medium was made alkaline with a 50 percent solution of caustic soda. During this operation, the temperature was maintained below 30°C. The precipitate of aluminium hydroxide so formed was then redissolved by means of an additional quantity of the 50 percent caustic soda solution. The organic phase was then separated out and the aqueous phase was extracted twice with dichlorethane. The organic phases were collected, washed with water and dried over anhydrous sodium sulphate. The solvent was then evaporated under reduced pressure and the resulting oily residue was distilled under high vacuum.

In this way, 25.7 g. of a very viscous oil, boiling at 135–145°C. under 0.001 mm. of Hg. were obtained which represented a yield of 59.6 percent. The product, 4-pyridyl-3-(2-isopropyl)-benzofuryl-ketone, crystallized when allowed to stand. M.P. 108°C. (when recrystallized from isopropanol).

To prepare the hydrochloride, the free base obtained in the foregoing manner was dissolved in ether. While stirring the resulting solution, gaseous hydrochloric acid was introduced into the solution, followed by the addition of a saturated solution of hydrochloric acid in ether, until complete precipitation of the hydrochloride had occurred. The product so formed was filtered out and washed over the filter with ether. After drying under vacuum, the hydrochloride product was recrystallised from a 50/50 ethyl acetate/isopropanol mixture. In this way, 20.5 g. of 4-pyridyl-3-(2-isopropyl)-benzofuryl-ketone hydrochloride were obtained, which represented a yield of 80 percent. M.P. 165°C. (decomposition).

By a procedure similar to that described in the foregoing Example, the following compounds were prepared from the starting compounds indicated:

| | M.P. |
|---|---|
| From 2-methyl-benzofuran | |
| 4-pyridyl-3-(2-methyl)-benzofuryl-ketone | 80°C. |
| From 2-methyl-5-methoxy-benzofuran | |
| 4-pyridyl-3-(2-methyl-5-methoxy)-benzofuryl-ketone | 45°C. |
| From 2-ethyl-benzofuran | |
| 4-pyridyl-3-(2-ethyl)-benzofuryl-ketone | 60°C. |
| 4-pyridyl-3-(2-ethyl)-benzofuryl-ketone hydrochloride | 145°C. |
| From 2-ethyl-5-methyl-benzofuran | |
| 4-pyridyl-3-(2-ethyl-5-methyl)-benzofuryl-ketone hydrochloride | 170°C. |
| From 2-ethyl-5-chloro-benzofuran | |
| 4-pyridyl-3-(2-ethyl-5-chloro)-benzofuryl-ketone | 98°C. |
| From 2-ethyl-5-bromo-benzofuran | |
| 4-pyridyl-3-(2-ethyl-5-bromo)-benzofuryl-ketone | 90°C. |
| From 2-n-propyl-benzofuran | |
| 4-pyridyl-3-(2-n-propyl)-benzofuryl-ketone | B.P. 145–150°C. (0.005 mm.Hg) |
| From 2-n-butyl-benzofuran | |
| 4-pyridyl-3-(2-n-butyl)-benzofuryl-ketone | 52°C. |
| From 2-(2-butyl)-benzofuran | |
| 4-pyridyl-3-[2-(2-butyl)]-benzofuryl-ketone hydrochloride | 183°C. |
| From 2-(1-propyl-2-methyl)-benzofuran | |
| 4-pyridyl-3-[2-(1-propyl-2-methyl)]-benzofuryl-ketone hydrochloride | 132°C. |
| From 2-(2-pentyl)-benzofuran | |
| 4-pyridyl-3-[2-(2-pentyl)]-benzofuryl-ketone hydrochloride | 142°C. |
| From 2-(3-pentyl)-benzofuran | |
| 4-pyridyl-3-[2-(3-pentyl)]-benzofuryl-ketone | B.P. 185–200°C. (0.01 mm.Hg) |
| From 2-(1-butyl-3-methyl)-benzofuran | |
| 4-pyridyl-3-[2-(1-butyl-3-methyl)]-benzofuryl-ketone | B.P. 160–170°C. (0.001 mm.Hg) |
| From 2-(1-propyl-2,2-dimethyl)-benzofuran | |

TABLE—Continued

| | M.P. |
|---|---|
| 4-pyridyl-3-[2-(1-propyl-2,2-dimethyl)]-benzofuryl-ketone | B.P. 175–180°C. (0.001 mm.Hg) |
| From 2-(4-heptyl)-benzofuran | |
| 4-pyridyl-3-[2-(4-heptyl)]-benzofuryl-ketone | B.P. 165–170°C. (0.001 mm.Hg) |
| From 2-cyclohexyl-benzofuran | |
| 4-pyridyl-3-(2-cyclohexyl)-benzofuryl-ketone hydrochloride | 195°C. |
| From 2-phenyl-benzofuran | |
| 4-pyridyl-3-(2-phenyl)-benzofuryl-ketone | 112°C. |
| From 2-(4-methyl-phenyl)-benzofuran | |
| 4-pyridyl-3-[2-(4-methyl-phenyl)]-benzofuryl-ketone | 120°C. |
| From 2-(4-chloro-phenyl)-benzofuran | |
| 4-pyridyl-3-[2-(4-chloro-phenyl)]-benzofuryl-ketone | 120°C. |
| From 2-n-hexyl-benzofuran | |
| 4-pyridyl-3-(2-n-hexyl)-benzofuryl-ketone hydrochloride | 120°C. |
| From 2-n-octyl-benzofuran | |
| 4-pyridyl-3-(2-n-octyl)-benzofuryl-ketone hydrochloride | 120°C. |

EXAMPLE 2

Preparation of the N-oxide of 4-pyridyl-3-(2-ethyl)-benzofuryl-ketone

Into a three-necked 500 ml. flask equipped with a vertical condenser, a dip thermometer, a dropping funnel and a mechanical stirrer, 175 ml. of dry dichlorethane, 14.6 g. (0.10 mol) of 2-ethyl-benzofuran and 24.5 g. (0.15 mol) of the chloride of isonicotinoyl-N-oxide were introduced. The mixture was stirred and cooled on an ice-bath at a temperature of 5°C. In small amounts, 37.5 g. of aluminium chloride were added to the mixture, care being taken to maintain the temperature of the mixture between 10 and 15°C. Stirring was continued for 24 hours at a temperature of 20°C. The mixture was cooled on an ice-bath and the resulting reaction complex hydrolysed with a 20 percent hydrochloric acid solution. The organic phase was extracted with dichlorethane, washed with water and dried over anhydrous sodium sulphate. After filtration, the solvent was evaporated under reduced pressure. The solid residue obtained was recrystallised from isopropanol. In this way 5.1 g. of the N-oxide of 4-pyridyl-3-(2-ethyl)-benzofuryl-ketone were obtained, which represented a yield of 19.1 percent. M.P. 135°C.

EXAMPLE 3

Tablets were prepared by compressing ungranulated powders of the following ingredients in accordance with known pharmaceutical techniques:

| TABLET A | mg. per tablet |
|---|---|
| 4-pyridyl-3-(2-isopropyl)-benzofuryl-ketone | 100 |
| Microcrystalline cellulose | 65 |
| Lactose | 145 |
| Polyvinylpyrrolidone | 15 |
| Colloid silica | 2 |

| TABLET A—Continued | |
|---|---|
| Talc | 7 |
| Magnesium stearate | 5 |
| Alginic acid | 11 |
| | 350 mg. |

| TABLET B | |
|---|---|
| 4-pyridyl-3-(2-isopropyl)-benzofuryl-ketone | 100 |
| Lactose | 134 |
| Corn Starch | 54 |
| Gelatine | 4 |
| Alginic acid | 6 |
| Magnesium stearate | 2 |
| | 300 mg |

| TABLET C | |
|---|---|
| 4-pyridyl-3-(2-isopropyl)-benzofuryl-ketone | 200 |
| Lactose | 110 |
| Corn Starch | 50 |
| Polyvinylpyrrolidone | 12 |
| Sodium carboxymethyl starch | 16 |
| Talc | 8 |
| Colloid silica | 1 |
| Magnesium stearate | 3 |
| | 400 mg |

We claim:

1. Method of inducing fibrinolysis in a mammal in need of said treatment, which comprises administering thereto 100 mg. to 1,000 mg. per 60 kg. of body weight per day of a benzofuran compound of the formula:

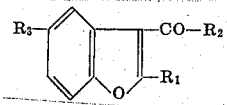

or a pharmaceutically acceptable acid addition salt thereof, wherein $R_1$ represents ethyl, n-propyl, isopropyl, n-butyl, 2-butyl, 2-methyl-1-propyl, 2-pentyl, 3-pentyl, 3-methyl-1-butyl, 2,2-dimethylpropyl, n-hexyl, n-octyl, cyclohexyl or p-tolyl, $R_2$ represents 4-pyridyl or 4-pyridyl-N-oxide, and $R_3$ represents hydrogen, methyl or bromine, with the proviso that when $R_3$ represents methyl or bromine, $R_1$ represents ethyl and $R_2$ represents 4-pyridyl, and that when $R_2$ represents 4-pyridyl-N-oxide, $R_1$ represents ethyl and $R_3$ represents hydrogen.

2. Method of claim 1 wherein $R_1$ is isopropyl, $R_2$ is 4-pyridyl and $R_3$ is hydrogen.

* * * * *